(12) United States Patent
Girard

(10) Patent No.: US 9,774,091 B2
(45) Date of Patent: Sep. 26, 2017

(54) DIELECTRIC SLOT ANTENNA USING CAPACITIVE COUPLING

(75) Inventor: Henri Girard, Carmel, IN (US)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 124 days.

(21) Appl. No.: 14/380,789

(22) PCT Filed: Mar. 20, 2012

(86) PCT No.: PCT/US2012/029789
§ 371 (c)(1),
(2), (4) Date: Aug. 25, 2014

(87) PCT Pub. No.: WO2013/141846
PCT Pub. Date: Sep. 26, 2013

(65) Prior Publication Data
US 2015/0026754 A1    Jan. 22, 2015

(51) Int. Cl.
*H01Q 13/18*     (2006.01)
*H01Q 1/24*      (2006.01)
*H04N 5/44*      (2011.01)
*H04N 21/426*    (2011.01)
*H01Q 1/22*      (2006.01)

(52) U.S. Cl.
CPC .............. *H01Q 13/18* (2013.01); *H01Q 1/24* (2013.01); *H04N 5/44* (2013.01); *H04N 21/426* (2013.01); *H01Q 1/2291* (2013.01)

(58) Field of Classification Search
CPC .................................................... H01Q 13/10
USPC ................................................. 343/702, 767
See application file for complete search history.

(56) References Cited

U.S. PATENT DOCUMENTS

| | | | |
|---|---|---|---|
| 5,757,326 A * | 5/1998 | Koyama | H01Q 1/22 343/702 |
| 6,798,385 B2 | 9/2004 | Kirino | |
| 8,912,958 B2 | 12/2014 | Miyakawa | |
| 2005/0195116 A1 | 9/2005 | Lotterer et al. | |
| 2005/0237251 A1 * | 10/2005 | Boyle | H01Q 1/243 343/770 |
| 2008/0231522 A1 * | 9/2008 | Montgomery | H01Q 13/10 343/702 |
| 2010/0066613 A1 * | 3/2010 | Hardacker | H01Q 1/2266 343/702 |
| 2010/0245184 A1 * | 9/2010 | Talty | H01Q 1/44 343/702 |

(Continued)

FOREIGN PATENT DOCUMENTS

| | | |
|---|---|---|
| CN | 1408131 | 4/2003 |
| CN | 101755366 A | 6/2010 |

(Continued)

*Primary Examiner* — Dameon E Levi
*Assistant Examiner* — David Lotter

(57) ABSTRACT

The present invention concerns a slot antenna for an electronic device, e.g. a set top box. A printed circuit board (210) comprising a dielectric material (310, 320, 330, 340, 350) and electrodes (240, 360) extends into a rectangular slot (120) in the metal enclosure (110) of the device such that the electrodes are coupled with locations on opposite edges of the long dimension of the rectangular slot. The coupling may be capacitively in order to affect the level of coupling or to optimize the driving point return loss. The presence of the dielectric in the slot allows the use of a shorter slot for a given wavelength.

20 Claims, 3 Drawing Sheets

(56) References Cited

U.S. PATENT DOCUMENTS

| | | | | |
|---|---|---|---|---|
| 2011/0163936 A1* | 7/2011 | Schneider | ............... | H01Q 3/247 343/893 |
| 2011/0241948 A1 | 10/2011 | Bevelacqua et al. | | |
| 2012/0068900 A1* | 3/2012 | Yatabe | ................... | H01Q 13/10 343/767 |
| 2012/0206302 A1* | 8/2012 | Ramachandran | ........ | H01Q 1/24 343/702 |

FOREIGN PATENT DOCUMENTS

| | | |
|---|---|---|
| CN | 101848013 A | 9/2010 |
| CN | 101971419 | 2/2011 |
| JP | 54-150356 | 11/1979 |
| JP | 19950193416 A | 2/1997 |
| JP | 19980145126 A | 11/1999 |
| JP | 2004357097 A2 | 12/2004 |
| JP | 2005244981 A | 9/2005 |
| JP | 2007124555 A2 | 10/2005 |
| JP | 2008131253 A2 | 6/2008 |
| WO | WO2007048589 | 5/2007 |

* cited by examiner

DIELECTRIC SLOT ANTENNA USING CAPACITIVE COUPLING

CROSS REFERENCE TO RELATED APPLICATION

This application claims the benefit, under 35 U.S.C. §365 of International Application PCT/US2012/029789, filed Mar. 20, 2012, which was published in accordance with PCT Article 21(2) on Sep. 26, 2013 in English.

BACKGROUND OF THE INVENTION

The present invention generally relates to a slot antenna for an electronic device. A printed circuit board comprising a dielectric material and electrodes extends into a rectangular slot in the metal enclosure of the device such that the electrodes are coupled with locations on opposite edges of the long dimension of the rectangular slot. The presence of the dielectric in the slot allows the use of a shorter slot for a given wavelength.

This section is intended to introduce the reader to various aspects of art, which may be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

The roles of televisions and television set top boxes are expanding beyond the presentation of broadcast content. These devices are evolving into portals to other sources of content, such as the Internet, and serving as media hubs for the home. Users also increasingly expect to be able to interact with, or control, televisions and set top boxes from mobile computing devices. Providing these functions requires network connectivity.

In many households, the television or set top box is not in the same location as the cable modem, DSL modem, or other device providing local-area network connectivity and Internet access to the home. Most households also lack appropriate wiring for a wired network connection between a television or set top box and a network router. Thus, it is advantageous for the television or set top box to have wireless networking functionality.

Wireless networking, however, adds cost and complexity to a television or set top box. In addition to the additional networking electronics, one or more antennas are also required.

Televisions and set top boxes have previously used both external and internal antennas, each with significant disadvantages. In the case of an external antenna, a coaxial cable is generally used to connect the antenna to the electronics within the device enclosure. Sometimes, electronics are also placed outside the enclosure to drive a printed, or other, antenna. These external antennas have the disadvantages of requiring additional cost, additional setup, additional complexity, and additional clutter in the user's environment.

Other implementations have used internal antennas. These have generally required that at least a portion of the device enclosure be plastic, to allow radiation to effectively pass. This may lead to increased unit cost, increased assembly cost, and decreased integrity of the device. Furthermore, the remaining metal portions of the enclosure, or other metal in the proximity of the internal antenna, may cause detuning or unwanted modification of the radiation pattern.

It is a problem to build a low cost, functional antenna for use in a set top box that eliminates most of the disadvantages of previous external and internal antennas, but provides the same function. The invention described herein addresses these and/or other problems.

SUMMARY OF THE INVENTION

In order to solve the problems described above, we disclose a slot antenna for an electronic device. A printed circuit board comprising a dielectric material and electrodes extends into a rectangular slot in the metal enclosure of the device such that the electrodes are coupled with locations on opposite edges of the long dimension of the rectangular slot. The presence of the dielectric in the slot allows the use of a shorter slot for a given wavelength. This and other aspects of the invention will be described in detail with reference to the accompanying Drawings.

BRIEF DESCRIPTION OF THE DRAWINGS

The above-mentioned and other features and advantages of this invention, and the manner of attaining them, will become more apparent, and the invention will be better understood, by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

As described herein, the present invention provides a slot antenna for an electronic device. A printed circuit board comprising a dielectric material and electrodes extends into a rectangular slot in the metal enclosure of the device such that the electrodes are coupled with locations on opposite edges of the long dimension of the rectangular slot. The presence of the dielectric in the slot allows the use of a shorter slot for a given wavelength.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The present invention may be implemented in a television set top box, television, computing device, or other electronic device requiring radio frequency transmission or reception.

Figure 1:
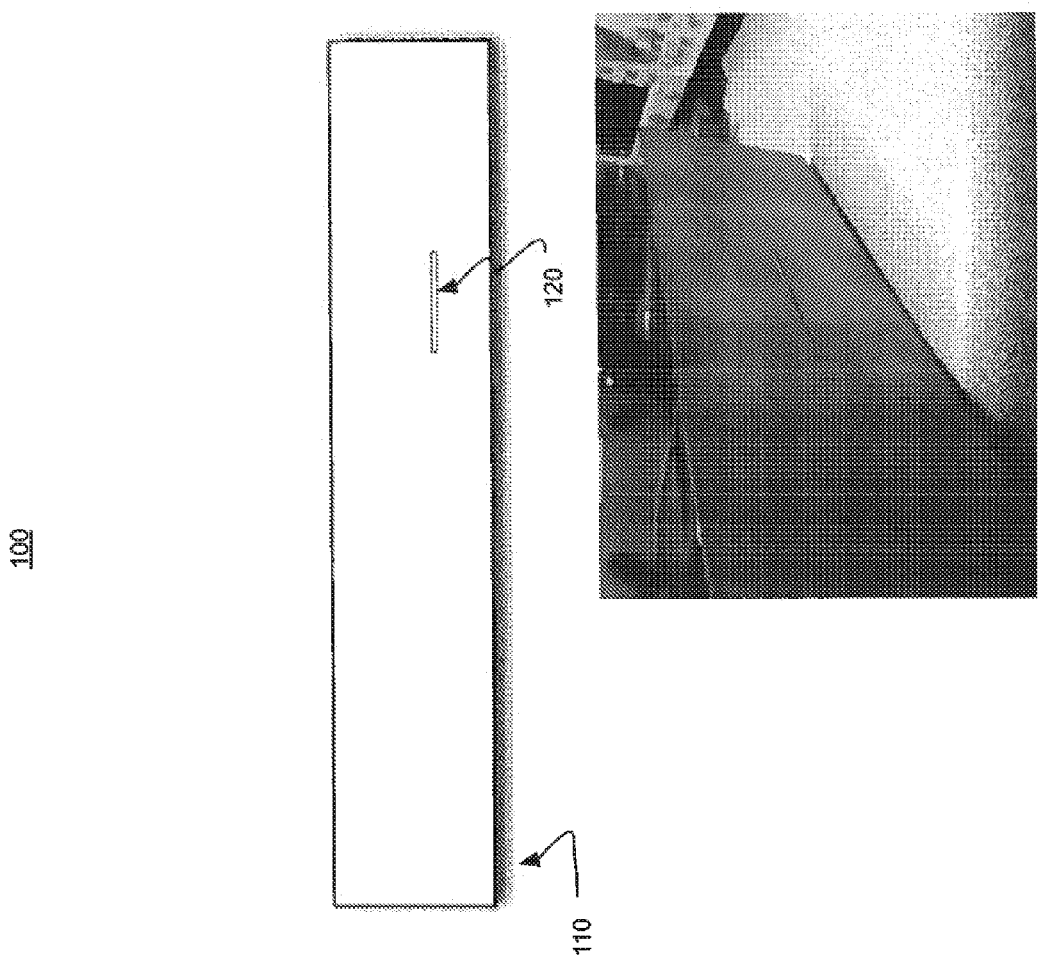
FIG. 1 is an external view of a set top box system comprising a slot antenna.

FIG. 1 is a diagram of a set top box system 100. Set top box 100 comprises a metal housing 110 with a slot 120. The front panel of set top box 100 may include, for example, a display or other status indicators, as well as user controls. The rear panel, not shown, may include, for example, connectors for video, audio, and networking connections.

The metal housing 110 may enclose various components including, for example, tuning circuitry, microprocessors, memory, a power supply, and a hard drive.

The appropriate length of slot 120 is determined by the transmission wavelength of interest. For wireless home networking, 2.4 GHz and 5 GHz are common frequencies. A personal area network (PAN) using the Bluetooth® standard may also operate at 2.4 GHz.

With an open slot, electromagnetic radiation will have a velocity of approximately c. The wavelength of a 2.4 GHz signal is computed as:

$$\lambda = \frac{c}{f} = \frac{3.0 \times 10^8 \text{ m/s}}{2.4 \times 10^9 \text{ Hz}} = 0.125 \text{ m}$$

A conventional slot antenna intended for a transmission or reception at a particular wavelength has a length of one-half of that wavelength. Thus, a slot antenna intended for 2.4 GHz would have a length equal to half of the 0.125 m wavelength, or 62.5 mm.

While a length of 62.5 mm is feasible in larger device, it can be desirable for the slot to be smaller for design, cost, and structural reasons. The presence of a dielectric in the slot will shorten the wavelength of the wave, and thereby reduce the required length of the slot antenna.

In the presence of a dielectric, the velocity of electromagnetic radiation will be reduced to:

$$v = \frac{c}{\sqrt{\varepsilon_r}}$$

where $\varepsilon_r$ is the relative permittivity of the dielectric. Thus, with a dielectric in the slot, the resulting wavelength of the 2.4 GHz signal is determined as:

$$\lambda = \frac{3.0 \times 10^8 \text{ m/s}/\sqrt{\varepsilon_r}}{2.4 \times 10^9 \text{ Hz}}$$

A relative permittivity $\varepsilon_r$ of 4, for instance, would reduce the wavelength of the signal by half. The required length of the slot would then correspondingly be reduced by half. The printed circuit board (PCB) comprising antenna electronics, when designed in accordance with the present invention, may serve as the slot antenna dielectric.

Figure 2:
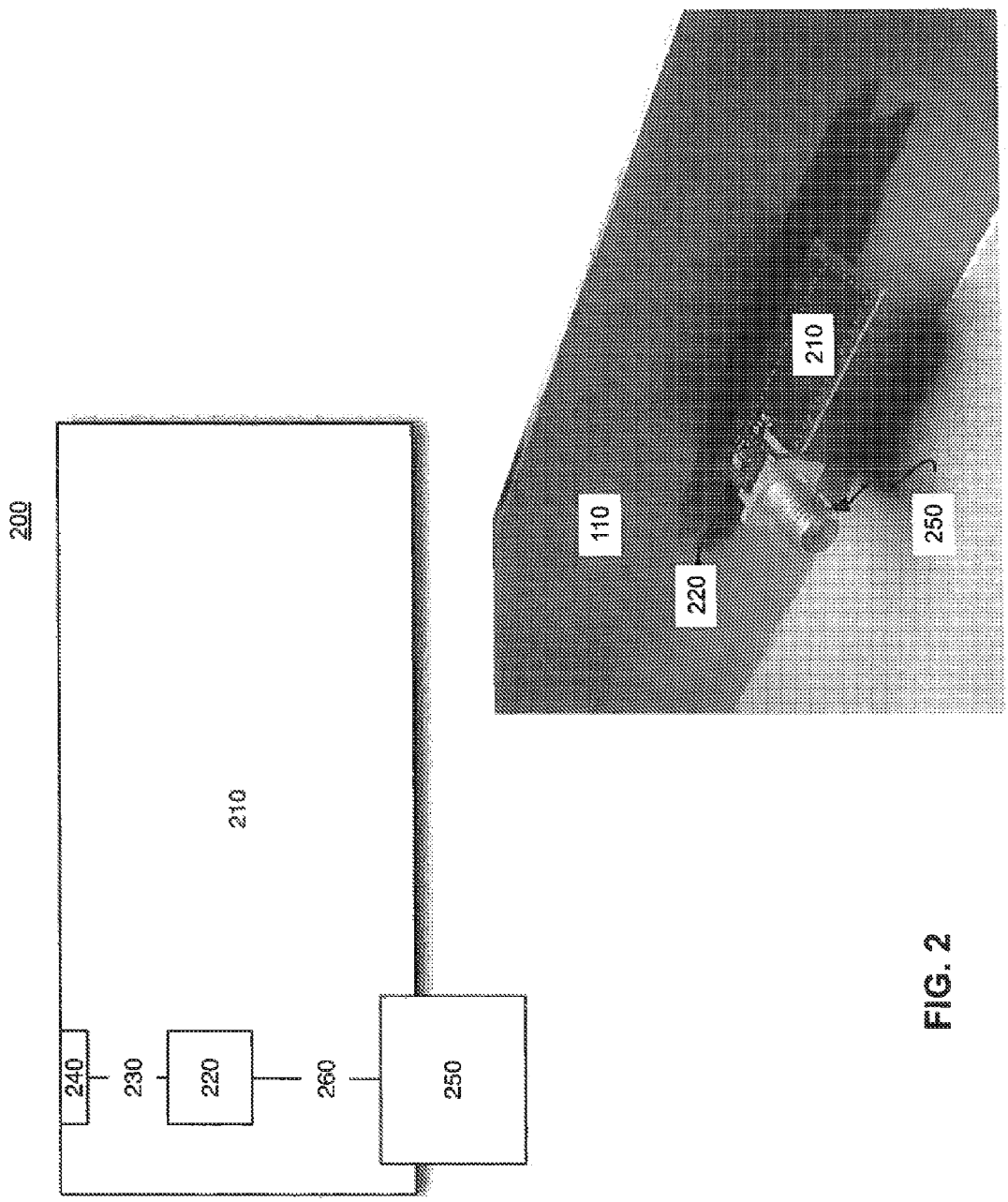
FIG. 2 is a diagram of a dielectric slot antenna.

FIG. 2 is an illustration of a top view of an embodiment of the present invention. A balun 220 on PCB 210 is connected to top electrode 240 via feed line 230, and to a second electrode, not shown, on the opposite surface of PCB 210 via a second feed line, also not shown. Balun 220 is connected via unbalanced line 260 to connector 250, which is used to connect the antenna to other circuitry in the set top box. In a preferred embodiment, connector 250 is a coaxial connector. In some embodiments, the connector may be a SubMiniature version A (SMA) connector. Other elements and connections may be present on the illustrated portion or other portions of PCB 210. The PCB 210 is inserted into the slot 120 in the metal housing 110 of the STB 100.

In the illustrated embodiment, PCB 210 is limited primarily to support of the antenna function. In other embodiments, PCB 210 may be a larger PCB containing a variety of functions, and connector 250 may not be required.

In preferred embodiments, balun transformers for impedances such as 50, 100, or 200Ω may be used. A possible balun for use in an embodiment using a 50Ω balun, for instance, would be the Anaren® Model BD2425J5050A00. The location of electrode 240 relative to the slot would vary with the selected impedance. In one embodiment utilizing a 50Ω balun, the electrodes would be placed approximately 3.125 mm from the edge of the printed circuit board and the edge of the slot. An impedance matching network, known in the art, could be used if the impedance at the balun was not sufficiently close to 50Ω.

Figure 3:
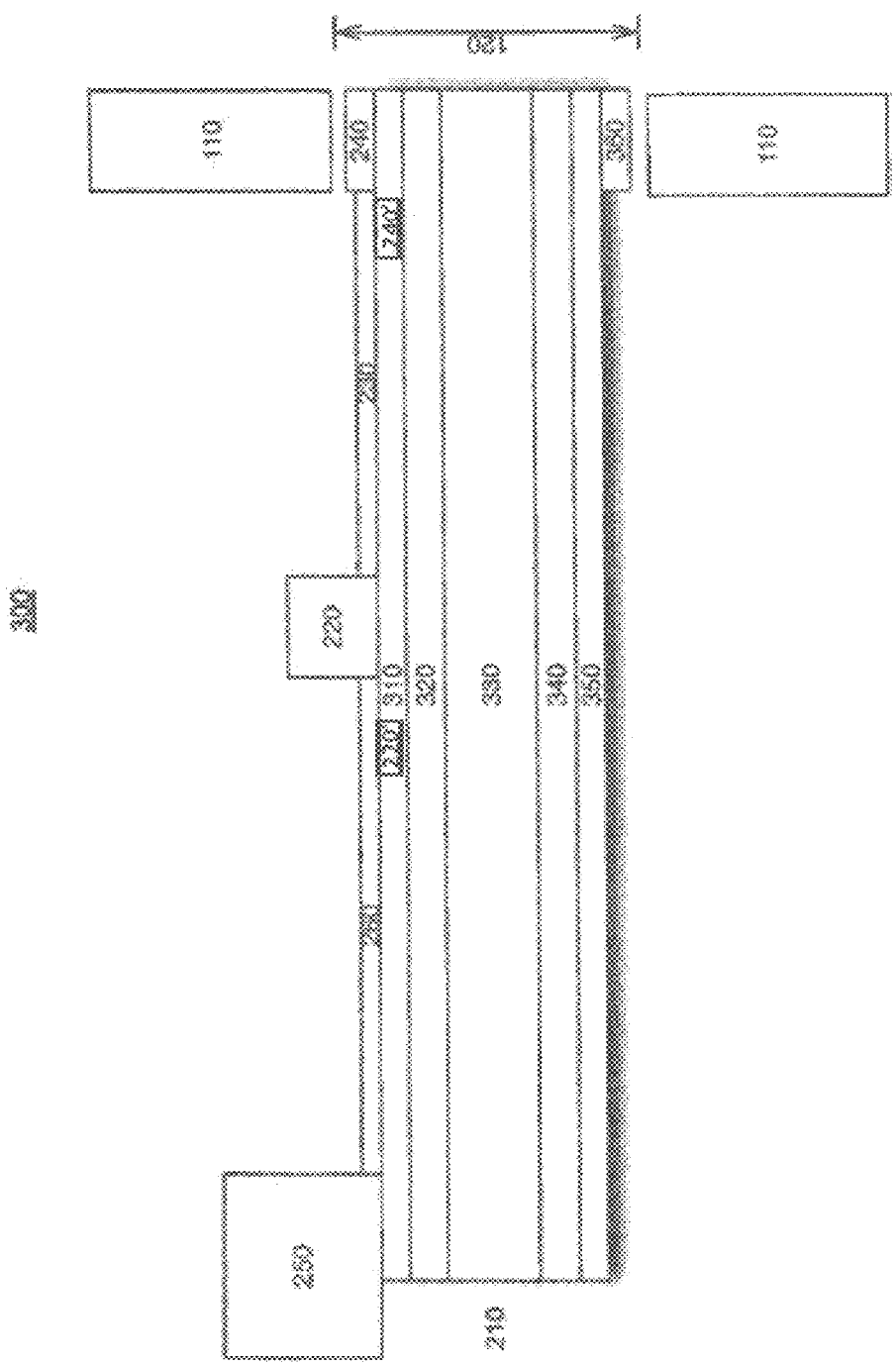
FIG. 3 is a side view of a dielectric slot antenna in a television set top box.

FIG. 3 is an illustration of a side view of the arrangement of FIG. 2. The PCB 210, in the illustrated embodiment, comprises dielectric substrate layers 310, 320, 330, 340, and 350. The PCB 210 is inserted into the slot 120 in the metal housing 110 of the STB 100. In the illustrated embodiment, first and second electrodes 240 and 360 are located on the top and bottom surfaces, respectively, of the PCB 210. Electrodes 240 and 360 may be printed with copper and act as the coupling mechanism to the slot. In some embodiments, a solder mask layer may act as a dielectric between the electrodes 240 and 360 and the slot edge.

As in FIG. 2, balun 220 on PCB 210 is connected to top electrode 240 via feed line 230, and to the bottom electrode 360 on the opposite surface of PCB 210 via a second feed line, not shown. Balun 220 is connected to connector 250, which is used to connect the antenna to other circuitry in the set top box.

Instead of the balanced line being directly connected to the driving point of the slot antenna, the balanced line is capacitively coupled. The coupling will, in preferred embodiments, have negligible impedance at the frequency used by the antenna. The design of the antenna may be adapted to maximize coupling efficiency between the board and the antenna. For instance, with a multi-layer PCB, the first and second electrodes 240 and 360 may be located on thin inner layers of PCB 210, further increasing the coupling. The PCB layers above the metal electrode 240 act as a dielectric, changing the capacitance between the electrode and the point in the slot that is excited. The shape of the electrodes 240 and 360 can be modified to affect the level of coupling. Design choices may also be made to optimize driving point return loss for the electronics driving the antenna and the radiation efficiency of the antenna.

In one preferred embodiment, PCB 210 would comprise five dielectric layers 310, 320, 330, 340, and 350 with thicknesses of approximately 0.118 mm, 0.13 mm, 0.41 mm, 0.13 mm, and 0.118 mm, and dielectric constants of approximately 3.99, 3.91, 4.07, 3.91, and 3.99, respectively. Thus, for this preferred embodiment, the average relative permittivity would be:

$$\varepsilon_r = \frac{0.118 \text{ mm}^*3.99 + 0.13 \text{ mm}^*3.91 + 0.41 \text{ mm}^*4.07 + 0.13 \text{ mm}^*3.91 + 0.118 \text{ mm}^*3.99}{0.906 \text{ mm}} = 4$$

As described above, a relative permittivity of 4 for the dielectric in the slot has the effect of reducing the wavelength of the signal by half, and thereby reducing the required slot length by half.

The PCB 210 may be enclosed by a metal enclosure, with only the slot 120 and the connector providing signal propagation paths. This would provide a structure where any number of radiators could be printed on the surface of the PCB 210, such as a monopole, dipole or spiral antenna. A cavity that covered completely the back of the antenna while allowing propagation through the slot would have the desirable advantage of limiting back radiation and provide greater directivity in the direction of the slot. In some cases for more omnidirectional coverage, no cavity would be used resulting in increased radiation from the no slot direction of the PCB. Vias at the back of the coupling on the side are not very effective to block that radiation. IN this last case, a cavity can also be calculated to be very reflective for the harmonics of the signal and thus act as a bandpass filter. Most implementations of transmitters have some low pass filter to eliminate the harmonics. This last case removes those components While the present invention has been described in terms of a specific embodiment, it will be appreciated that modifications may be made which will fall within the scope of the invention. For example, set top box functionality may be housed in a separate enclosure or within the enclosure of the television display device itself. Thus, a slot in the enclosure of a television device may also be used as an antenna. Different reductions in slot length may be achieved through the use of different dielectric materials in the PCB. Different slot shapes may be employed to allow reception at multiple frequencies, such as 2.4 GHz and 5.8 GHz. Furthermore, different numbers of antennas may be combined when appropriate for the communication technique.

The invention claimed is:

1. An apparatus comprising:
    a metal enclosure for an electronic device having a rectangular slot on a surface of the metal enclosure;
    a printed circuit board comprising a dielectric material; and
    two electrodes integral to the printed circuit board;
    wherein a portion of the printed circuit board comprising the dielectric material extends into the rectangular slot on the surface of the metal enclosure such that the electrodes are capacitively coupled with locations on opposite edges of the long dimension of the rectangular slot forming a dielectric slot antenna via the dielectric material and the rectangular slot on the surface of the metal enclosure.

2. The apparatus of claim 1 further comprising a balun connected to the electrodes.

3. The apparatus of claim 2 wherein the balun is mounted on a surface of the printed circuit board.

4. The apparatus of claim 2 further comprising a radio frequency transceiver connected to the balun.

5. The apparatus of claim 4 wherein the radio frequency transceiver is operative to communicate using the slot as an antenna.

6. The apparatus of claim 4 wherein the radio frequency transceiver operates at least one of approximately 2.4 GHz or 5 GHz.

7. The apparatus of claim 1 wherein the printed circuit board is a multilayer printed circuit board.

8. The apparatus of claim 7 wherein the electrodes are formed on inner layers of the multilayer printed circuit board.

9. The apparatus of claim 1 wherein the slot length is approximately 31.25 mm and the electrodes are disposed approximately 3.125 mm from the edge of the printed circuit board.

10. The apparatus of claim 1 wherein the slot length is approximately 31.25 mm and the electrodes are disposed approximately 6.25 mm from the edge of the printed circuit board.

11. The apparatus of claim 1 wherein the slot length is approximately 31.25 mm and the electrodes are disposed approximately 12.5 mm from the edge of the printed circuit board.

12. The apparatus of claim 1 wherein the slot height is approximately 0.9 mm.

13. The apparatus of claim 1 wherein the portion of the printed circuit board that extends into the rectangular slot substantially fills the rectangular slot.

14. A television set top box system comprising the apparatus of claim 1.

15. A set top box comprising:
    a metal enclosure for the set top box having a rectangular slot on a surface of the metal enclosure;
    a printed circuit board;
    a balun connected to two electrodes integral to the printed circuit board; and a radio frequency transceiver;
    wherein a portion of the printed circuit board extends into the slot such that the electrodes are capacitively coupled with opposite edges of the long dimension of the slot; and
    wherein said radio frequency transceiver is operative to send and receive signals using said rectangular slot as an antenna driven by a signal path comprising said balun and said electrodes.

16. The set top box of claim 15 wherein said radio frequency transceiver operates at least one of approximately 2.4 GHz or 5 GHz.

17. The set top box of claim 15 wherein said radio frequency transceiver is operative to receive signals from a radio frequency remote control using the rectangular slot as an antenna.

18. The set top box of claim 15 wherein said radio frequency transceiver is operative to send signals to, and receive signals from, a wireless router using the rectangular slot as an antenna.

19. A method of communication in an electronic device comprising:
    generating a signal with a radio frequency transceiver;
    transmitting the signal to electrodes on a printed circuit board comprising dielectric material, wherein a portion of the printed circuit board extends into a slot on a surface of a metal enclosure for the electronic device such that the electrodes are capacitively coupled with opposite edges of the long dimension of the slot to form a dielectric slot antenna via the dielectric material and the slot on the surface of the metal enclosure.

20. The method of claim 19 wherein the electronic device comprises a television set top box.

* * * * *